United States Patent [19]
Molis

[11] 3,715,169
[45] Feb. 6, 1973

[54] SPRING-LIQUAMATIC PRESS O-RING PLASTIC ROTO SEAL FOR ROTARY PUMP SHAFTS

[76] Inventor: John Molis, P.O. Box 3915, Station A, Baytown, Tex. 77520

[22] Filed: Sept. 1, 1971

[21] Appl. No.: 176,915

[52] U.S. Cl....................415/170, 277/96 D, 277/81
[51] Int. Cl..............................................F01d 11/08
[58] Field of Search.......415/170 R, 168; 277/81, 83, 277/93 SD, 96

[56] References Cited

UNITED STATES PATENTS

| | | | |
|---|---|---|---|
| 2,531,079 | 11/1950 | Payne | 277/96 R |
| 2,723,868 | 11/1955 | Hartranft | 277/81 |
| 2,735,701 | 2/1956 | Ecker et al. | 277/93 SD |
| 2,743,121 | 4/1956 | Stevens | 277/81 |
| 2,882,075 | 4/1959 | Biering et al. | 415/170 A |
| 3,050,319 | 8/1962 | Colby | 277/96 R |
| 3,072,414 | 1/1963 | Porges | 277/81 |
| 3,101,200 | 8/1963 | Tracy | 277/81 |
| 3,136,558 | 6/1964 | Wade | 277/81 |
| 3,420,584 | 1/1969 | Cannon | 277/96 R |

Primary Examiner—C. J. Husar
Attorney—Arlington C. White

[57] ABSTRACT

A shaft seal to prevent a fluid from flowing to and along a rotary pump shaft and escaping from the interior to the exterior of a housing in which the pump shaft is journaled and from which it extends. The seal includes a pair of end bushings of which one is directly connected to the shaft and the other end bushing is mounted on the housing, and a pair of intermediate pin-connected bushings slip-fitted upon the shaft with a compression spring urging the intermediate bushings toward one another and maintaining an elastomer ring under compression therebetween to seal off flow of fluid around the shaft and between such pin-connected intermediate bushings, and a pair of opposed resilient plastic rings pin-mounted and connected on one of the intermediate bushings and the end bushing on the housing to seal off flow of fluid therebetween and from around the shaft, and a strong-back detachably mounted on the housing for holding the plastic-rings under pressure in sealing engagement with one another.

6 Claims, 4 Drawing Figures

PATENTED FEB 6 1973　　　　　　　　　　　　　　　3,715,169

INVENTOR.
JOHN MOLIS
BY
Arlington White
ATTORNEY

SPRING-LIQUAMATIC PRESS O-RING PLASTIC ROTO SEAL FOR ROTARY PUMP SHAFTS

My invention is directed to the provision of a seal for a rotary pump shaft which obviates to a large extent many of the economic disadvantages of prior seal assemblies and seal manufacture by reason of the elimination of sleeves as well as requisite sleeve packing, and also some of the disadvantageous operational aspects of such prior devices; affording, for example, ease of dissembling and assembling as well as ready accessibility to parts for rapid replacements.

A primary object of my present invention is to provide a spring-liquamatic press O-ring plastic roto seal for rotary pump shafts which is relatively simple to fabricate and facile to assemble on old or new pump shafts by the unskilled as well as the skilled.

Another important object of the invention is to provide a seal of the indicated nature for rotary pump shafts which is additionally characterized by the elimination of conventional packing as well as of costly shaft sleeves having relative rotation with the packing and which deteriorate rapidly.

A further object of my invention is to provide a seal of the aforementioned character for rotary pump shafts which eliminates leakage about packing with resultant pollution of surrounding areas.

A still further object of the invention is to provide a shaft seal which can be effectively and efficaciously used with complete sanitary achievement in pumps for pumping drinking water, which will be entirely free of packing contamination.

Another important object is to provide a safe and effective heat-resistant and friction-resistant shaft seal for rotary pumps enabling the safe pumping of ignitable fluids, with danger of combustion reduced to a minimum.

Other objects of the invention will appear from the following description of the best mode contemplated by me in carrying out the invention, and the manner of constructing, assembling and using the same. It is to be understood that a preferred embodiment and certain modified embodiments shown in the accompanying drawings are mainly for illustrative purposes as the appended claims are intended to cover the embodiments shown as well as variations thereof within the scope of the invention.

Referring to the drawings.

Figure 1:
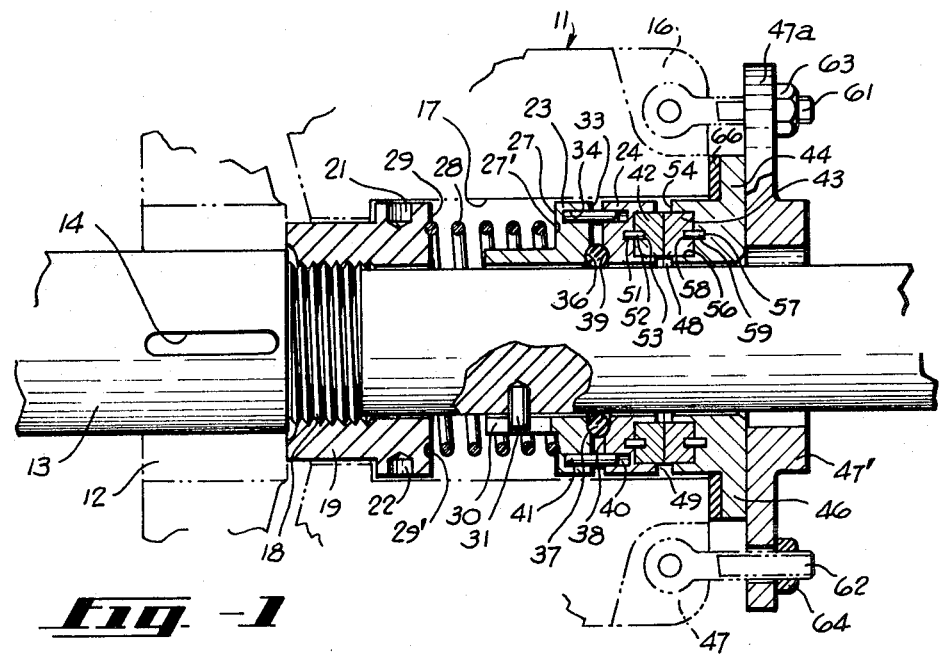
FIG. 1 is a longitudinal sectional view of an embodiment of my invention installed in operative assembled position, part of the housing being broken away to illustrate the shaft and seal assembly.

As particularly illustrated in FIG. 1 of the annexed drawings, I have shown a typical assembly, designated generally by the reference numeral 11 of a connected pump-impeller 12 and rotary shaft 13, the impeller being fixedly secured to the shaft in the conventional manner by means of a key and keyway fit, as indicated at 14. The pump shaft 13 extends to a source of energy, not shown, through and is journaled in a housing 16 such as a pump housing, having an interior seal chamber 17 containing a quantity of fluid, the flow of which along the shaft 13 axially as well as to the shaft radially is to be prevented. Conveniently, I fashion the shaft 13 with an exterior threaded section 18 for the reception of an internally threaded bushing 19 cast or otherwise formed from brass or stainless steel stock to provide therein a pair of diametrically disposed recesses 21 and 22 for receiving the opposed jaws of a wrench, all not shown, whereby bushing 19 can be tightened upon or untightened from shaft 13 to maintain the rigidity of fit between the impeller 12 and shaft 13.

In accordance with the present invention, I omit all shaft sleeves and conventional packings and in lieu thereof, I provide a liquamatic press O-ring and plastic roto seal assembly wherein I include a pair of opposed bushings 23 and 24 which are connected together as hereinafter described and which are disposed upon the shaft 13 in spaced relation to the fixedly secured bushing 19. As shown, I preferably fashion the two bushings of brass or stainless steel and provide an annular flange 26 on end 27 of bushing 23 which affords a seat for one end of a coil spring 28 that encircles the shaft 13 and is confined between an outer end 29 of bushing 19 and outer end 27 of bushing 23. Conveniently, the ends 29 and 27 of bushings 19 and 23, respectively are formed with shallow annular recesses 29' and 27', respectively, into which the opposite ends of coil spring 28 are seated; the spring 28 acting as a compression spring to urge the bushing 23 toward the bushing 24. The annular projecting flange 26 of bushing 19 conveniently is slotted, as indicated at 30, for passing and at the same time permitting access to a threaded plug 31 formed by threadedly engages the interior threads of a cavity 32 formed by tapping into shaft 13.

Figure 2:
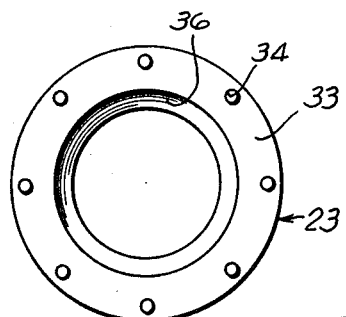
FIG. 2 is a plan view of one of the intermediate bushings showing an O-ring seat.
Figure 3:
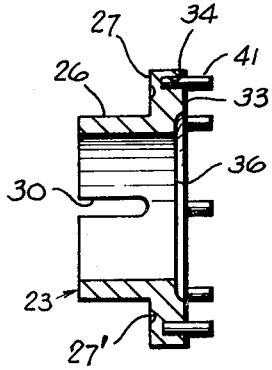
FIG. 3 is a sectional view of the bushing shown in FIG. 2. This view also showing the connecting adjacent intermediate bushings.

In addition to the shallow annular recess 27' in the outer end face of bushing 23, I fashion the inner end face 33 thereof with spaced apart holes 34 adjacent the periphery of the bushing and provide a dished area or concave portion 36 therein immediately adjacent to the periphery of shaft 13 for the reception of a portion of an elastomer or O-ring 37. Similarly, I fashion the inner face 38 of adjacently disposed bushing 24 with a dushed area of concave portion 39 adjacent to the periphery of shaft 13, which concave portion 39 is complementary to the dished area 36 of bushing 23 and wherein the remaining portion of the elastomer of O-ring 37 is disposed. With the action of the coil compression spring 28 urging the bushing 23 toward the bushing 24, the O-ring is held under pressure and effectively seals off the shaft 13 against fluid flow from chamber 17 of housing 16. The inner end face 38 of bushing 24 is further similarly formed to the inner end face of bushing 13 by the provision therein of spaced apart holes 40 which are in registry or alignment with the spaced holes 34 of the inner end face 33 of bushing 23, and I provide in the two series of holes 34 and 40 a series of connecting steel pins 41 circumferentially arranged in spaced relationship to one another, but inwardly spaced from the peripheries of such bushings, see FIGS. 2 and 3. Thus, the two bushings 23 and 24 are driven together and rotate with the shaft 13 along with bushing 19, the coil spring 28 and one of the bushings hereinafter described.

To complete the shaft seal of the present invention, I provide a pair of resilient plastic rings 42 and 43 of square cross-section which are disposed and held in relatively rotational relationship between the bushing 24 and a flange end bushing 44, the annular flange 46 of the latter, seating upon a sealing gasket 66 on the outer distal end 47 of housing 16 and held in stationary rigid contact therewith by means of a removably seated strongback 47', see FIG. 1, to seal off escape of fluid from chamber 17 through the distal end of housing 16. In order to provide a seat for the plastic ring 42, I conveniently fashion the outer end face 48 of bushing 24 with an annular recess 49 of square cross-section, and provide a series of narrow recesses 51 which extends from the outer end face 48 at the approximate center of the recess 49 into the bushing 24 a short distance for receiving a series of steel connecting pins 52 which are fitted at 90° spaced apart intervals into the short narrow recesses 51 as well as into narrow recesses 53 which are in alignment with the recesses 51 and which extend into the plastic ring 42. Similarly, I provide a seat for the plastic ring 43 by fashioning the inner end face 54 of end bushing 44 with an annular recess 56 of square cross-section therein which registers with the recess 49 of the outer end face 48 of bushing 24 and which snugly receives the plastic ring 43 of square cross-section. It is to be noted that I also form the inner end face 54 of bushing 44 with a plurality of relatively narrow recesses 57 which are in alignment with narrow recesses 58 of plastic ring 43, and which extend inwardly into end bushing 44 for the reception of a portion of short the steel pins 59 which extend into the recesses 58 of the plastic ring 43 at circumferentially spaced intervals of 90° from one another. Thus, the pins 52 hold the plastic ring 42 upon the outer end face 48 of bushing 24 while the pins 59 hold the plastic ring 43 upon the outer end face of bushing 44. The meeting faces of the plastic rings 42 and 43 will have some wear due to the fact that plastic ring 42 will rotate with the shaft 13 because its retention bushing 24 is connected to and driven by bushing 23 so that the compression coil spring 28 and the bushings 23 and 24 all rotate with shaft 13 while bushing 44 with its retained plastic resilient ring 43 remain stationary.

Any suitable means can be employed to fasten the strongback 47' to the housing 16 in seating engagement with the inner end face of end bushing 44. In the embodiment illustrated, I have provided a pair of screwbolts 61 and 62 arranged 180° apart and piercing not only the strong-back 47' but also the housing 16 and a pair of nuts 63 and 64, respectively, that can be tightened down on the bolts 61 and 62 to engage the flange 47a of the strong-back 47' and hold it firmly in position and urging the bushing 44 to seat upon sealing gasket 66 under pressure.

It will be clear from a study of the annexed drawings that the liquamatic press O-ring plastic roto seal of my present invention can be disassembled from the shaft 13 and housing 16 with facility and just as easily reassembled with one part replaced or a number of worn parts replaced. To disassemble, the strong-back 47' is first removed and laid aside, the gasket 66 either left in place, if intact, or removed after first lifting off the end bushing 44 which had been placed in operative position by sliding the same along the shaft, the retained plastic ring 43 being carried out along with bushing 44. If no further replacement is required than the ring 43, the disassembly is of course stopped at that point and a new ring substituted for worn ring 43 and the strong-back 47' as well as a new gasket 66 placed in position followed by a tightening of the nuts 63 and 64 on bolts 61 and 62, respectively. Should it be necessary to replace a worn spring 28, the attendant or pump operator proceeds with the strong-back 47' laid aside, to remove bushings 23 and 24 by sliding them outwardly along the shaft 13, together with the O-ring 37, which exposes the spring 28 so that it can then be lifted out and replaced. The assembly operation with a new coil spring in place is merely to slide the pin-connected bushings 23 and 24 back along the shaft with the outer end face 27 engaging the adjacent end of the spring 28, with the O-ring 37 compressed between the two bushings 23 and 24 as before by press-fitting the end bushing 44 with its retained plastic Teflon ring 43 into engagement with the plastic Teflon ring 42 seated in the outer end face of the bushing 24. Thereafter the gasket 66 is positioned on the distal end 47 of housing 16 and the strong-back 47' tightened into closing position on such distal end of the housing to seal the same again. The strong-back 47' can be a conventional packing gland in reversed position. The plastic rings 42 and 43 are friction resistant and combustion-resistant, preferably fabricated from Teflon, and are pressed into position by a conventional sealer in the same manner of press-fitting the steel pins 34 in position for providing the driving connections between bushings 23 and 24.

Figure 4:
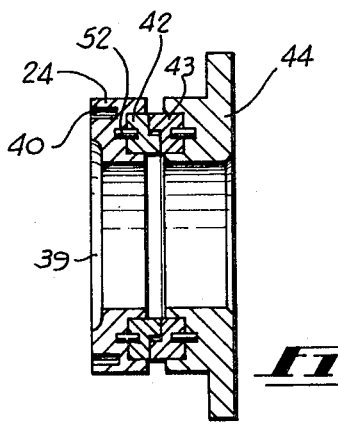
FIG. 4 is a sectional elevational view of a modified construction of the roto plastic rings constituting part of my rotary shaft seal.

As illustrated in FIG. 4 of the annexed drawings, the Teflon rings 42' and 43' can be formed to a L-shaped rather than having uniform circular meeting surfaces. Such L-shaped rings of the modified embodiment of FIG. 4 are retained in the adjacent end faces of the bushings 24 and 44, with off-set engaging surfaces 42a and 42b of the teflon rings 42' and 43'. In either case, the teflon rings 42 and 43, or the teflon rings 42' and 43' effectively seal off flow of fluid radially to the shaft 13 as well as axially along the shaft.

In order to seal off fluid flow to and along steam driven turbine shafts, the teflon rings 42 and 43 could be replaced by carbon rings, and the O-ring 37 then changed from a rubberized ring to a heat-resistant compressible gasket. Moreover, the ring gasket 66 should be changed to a heat-resistant gasket and the threaded bushing 19 could be changed to thread and extend the cavities through to open at the shaft, and a pair of removable set screws threaded therein to bear upon shaft 13.

It is of course to be understood that the threads on shaft 13 which are engaged by the threads on bushing 19 may be either left hand threads or right hand threads depending upon the direction of rotation of shaft 13. For example, in a rotary pump wherein the shaft extends from one end of the casing 16 with the drive so connected as to cause the shaft 13 to rotate clockwise, the shaft 13 and bushing 19 are to be threaded with left hand threads so that the bushing 19 will be maintained in a secured position supporting the impeller 12 onto the shaft 13. In a pump wherein the shaft extends on both sides of housing 16, and the shaft 13 is driven clockwise, the opposite end of impeller shaft 13 and a bushing similar to bushing 19 must be threaded right handed; and two shaft seal will be necessary.

The appended claims are intended to cover the embodiments illustrated as well as variations thereof within the scope of the invention.

I claim:

1. An assembly for effecting a fluid-tight seal between relatively rotatable elements comprising, in combination with a housing having a fluid chamber therein and a shaft journaled in said housing and projecting from opposite ends thereof for attachment to an impeller at one end thereof and a driven member at the other end thereof; said assembly comprising a threaded bushing detachably connected to said shaft at the impeller end thereof, a pair of intermediate bushings slidably mounted on said shaft in spaced relation to said threaded bushing; said intermediate bushings being arranged in opposed relationship to one another and having centrally disposed concave portions in opposed end faces thereof as well as having a series of cavities therein arranged in alignment with one another adjacent to their peripheries, a compression spring encircling said shaft and confined between said threaded bushing and said intermediate bushings to urge them together, an O-ring seated in said concave portions of said intermediate bushings, pins in said cavities of said intermediate bushings to lock the same in driving connection, an end bushing encircling said shaft and fixedly mounted on said housing; said end bushing having an annular recess in its outer face, a first plastic ring seated in said annular recess of said outer end face of said end bushing, a second plastic ring seated in the outer end face of one of said intermediate bushings adjacent to said end bushing, and a closure detachably secured to said housing and engaging said end bushing to press said first and said second plastic rings toward one another and to maintain pressure upon said O-ring to seal the shaft against flow of fluid to said shaft and axially along the same.

2. An assembly as set forth in claim 1 wherein said outer face of one of said intermediate bushings adjacent to said end bushing has an annular recess therein for receiving said second plastic ring.

3. An assembly as set forth in claim 1 wherein the intermediate bushing facing said end bushing has a plurality of cavities therein extending inwardly from the center of said annular recess therein, and wherein said second plastic ring has a series of inwardly extending cavities in alignment with the cavities in said intermediate bushing, and pins in said cavities for holding said second plastic ring in said annular recess of said intermediate bushing.

4. An assembly as set forth in claim 1 wherein said end bushing has a plurality of cavities therein extending inwardly from said annular recess therein and wherein said first plastic ring has a plurality of cavities therein in alignment with said plurality of cavities in said end bushing, and pins in said cavities for holding said first plastic ring in said annular recess of said end bushing.

5. An assembly as set forth in claim 1 wherein said threaded bushing has a pair of cavities in the periphery thereof spaced apart 180° circumferentially for receiving a wrench to tighten and untighten said threaded bushing on said shaft; the threads on said shaft and said bushing being counterwise to the direction of rotation of the shaft.

6. An assembly as set forth in claim 1, and a sealing gasket between said end bushing and said housing.

* * * * *